(12) United States Patent
Kodani et al.

(10) Patent No.: US 9,563,056 B2
(45) Date of Patent: Feb. 7, 2017

(54) OPTICAL SCANNER

(71) Applicant: Shinano Kenshi Kabushiki Kaisha, Ueda-shi, Nagano (JP)

(72) Inventors: Masayuki Kodani, Ueda (JP); Nobuchika Maruyama, Ueda (JP)

(73) Assignee: SHINANO KENSHI KABUSHIKI KAISHA, Ueda-Shi, Nagano (JP)

( * ) Notice: Subject to any disclaimer, the term of this patent is extended or adjusted under 35 U.S.C. 154(b) by 0 days.

(21) Appl. No.: 14/753,966

(22) Filed: Jun. 29, 2015

(65) Prior Publication Data

US 2015/0378152 A1 Dec. 31, 2015

(30) Foreign Application Priority Data

Jun. 30, 2014 (JP) ................. 2014-133531

(51) Int. Cl.
*G02B 26/08* (2006.01)
*G02B 26/12* (2006.01)
*G02B 7/182* (2006.01)
*H02K 21/22* (2006.01)
*H02K 7/14* (2006.01)
*G02B 5/09* (2006.01)

(52) U.S. Cl.
CPC ............. *G02B 26/12* (2013.01); *G02B 7/1821* (2013.01); *G02B 26/121* (2013.01); *H02K 7/14* (2013.01); *H02K 21/22* (2013.01); *G02B 5/09* (2013.01)

(58) Field of Classification Search
CPC ..... G02B 26/12; G02B 26/127; G02B 21/121; G02B 26/105; G02B 7/1821; G02B 26/0816; G02B 5/09; H02K 7/003; H02K 7/083; H02K 7/09; H02K 7/14; H02K 7/086

USPC .............. 359/216.1–218.1, 200.1; 310/91
See application file for complete search history.

(56) References Cited

U.S. PATENT DOCUMENTS

| 4,637,680 A | 1/1987 | Kuwabara |
| 6,087,749 A * | 7/2000 | Ishizuka ............. G02B 26/121 310/91 |

(Continued)

FOREIGN PATENT DOCUMENTS

| JP | 03-042516 | 7/1989 |
| JP | 09-081659 | 3/1997 |

(Continued)

OTHER PUBLICATIONS

European Search Report dated Nov. 20, 2015 in European Patent Application No. 15170214.9.

(Continued)

*Primary Examiner* — Euncha Cherry
(74) *Attorney, Agent, or Firm* — Stephen J. Weyer; Stites & Harbison, PLLC

(57) ABSTRACT

The optical scanner comprises: a motor having an rotor shaft; a rotor being attached to the rotor shaft; a tilt mirror having an inclined reflective surface and being attached to the rotor shaft together with the rotor; and a bearing section being provided to a stator housing and capable of rotatably holding the rotor shaft. The rotor and the tilt mirror are prohibited from detaching from and rotating with respect to the rotor shaft. A recessed part, through which the rotor shaft is penetrated, is formed in the tilt mirror. An elastic member, which always biases the tilt mirror toward the rotor, is provided between a retainer section and an inner bottom part of the recessed part.

5 Claims, 1 Drawing Sheet

(56) References Cited

U.S. PATENT DOCUMENTS 7,095,541 B2 * 8/2006 Liu .................. G02B 26/101
359/219.2
2008/0260312 A1 10/2008 Nishino et al.

FOREIGN PATENT DOCUMENTS

| JP | 11-231248 | 8/1999 |
| JP | 2000-330062 | 11/2000 |
| JP | 2005-215515 | 8/2005 |
| JP | 2006/187970 | 7/2006 |
| JP | 2010/020200 | 1/2010 |

OTHER PUBLICATIONS

Japanese Office Action dated Apr. 26, 2016 in Japanese Patent Application No. 2014-133531.

* cited by examiner

OPTICAL SCANNER

CROSS-REFERENCE TO RELATED APPLICATION

This application is based upon and claims the benefit of priority of the prior Japanese Patent Application No. 2014-133531, filed on Jun. 30, 2014, and the entire contents of which are incorporated herein by reference.

FIELD

The present invention relates to an optical scanner, in which a tilt mirror for scanning light emitted from a light source and receiving reflected light, for example, is attached to a rotor shaft together with a rotor.

BACKGROUND

In an optical scanner, a polygon mirror having a regular polygon shape is fitting to a rotor shaft together with a rotor. Concretely, a rotor yoke is rotatably attached to the rotor shaft, which is rotatably held by a stator housing. The polygon mirror is attached to the rotor yoke in a state where the polygon mirror is prohibited from rotating with respect to and detaching from the rotor yoke. To avoid deformation and strain, the polygon mirror is attached together with the rotor yoke without being directly fixed to the rotor shaft. However, the polygon mirror is attached to an end part of the rotor shaft, so the polygon mirror is axially pressed toward the rotor yoke, so as not to detach, by a biasing member, e.g., plate spring, capable of biasing a top plate part of the rotor yoke (see Patent Document 1).

PRIOR ART DOCUMENT

Patent Document 1: Japanese Laid-open Patent Publication No. 2000-330062

SUMMARY

In Patent Document 1, the top plate part of the polygon mirror is generally formed flat, and a top plate part of a tilt mirror having a multiple truncated pyramid shape is also formed flat and has enough installation area of the biasing member, e.g., presser spring.

However, in case of increasing light quantity of the tilt mirror and securing a wide mirror-reflective area, the area of the top plate part must be highly reduced, so a space for installing the biasing member, e.g., presser spring, cannot be secured. For example, a fixing manner of press-fitting the mirror into the rotor shaft cannot be employed due to occurrence of strain.

Further, if the biasing member, e.g., plate spring, is provided to the top plate part of the tilt mirror, an axial height thereof must be high, so a size of the optical scanner must be large in the axial direction.

The present invention has been invented to solve the above described problems of the conventional technology.

Accordingly, an object of the present invention is to provide an optical scanner, which is capable of highly increasing a reflective area of a tilt mirror and securely retaining the tilt mirror.

To achieve the object, the present invention has following structures.

Namely, the optical scanner of the present invention comprises:

a motor having an rotor shaft;

a rotor being attached to one end part of the rotor shaft;

a tilt mirror having an inclined reflective surface, the tilt mirror being attached to the rotor shaft together with the rotor; and a bearing section being provided to a stator housing and capable of rotatably holding the rotor shaft, the rotor and the tilt mirror are prohibited from detaching from and rotating with respect to the rotor shaft, a recessed part, through which the rotor shaft is penetrated, is formed in a top part of the tilt mirror, and an elastic member, which always biases the tilt mirror toward the rotor, is provided between a retainer section, which is attached to a position immediately above the recessed part, and an inner bottom part of the recessed part.

With the above described structure, the elastic member is provided between the retainer section, which is attached to the position immediately above the recessed part, and the inner bottom part of the recessed part, so that the tilt mirror can be securely retained by always biasing the tilt mirror toward the rotor. Therefore, the tilt mirror can be made higher in the axial direction so as to increase a reflective area of the reflective surface. Further, the tilt mirror can be securely retained without being made large in the axial direction.

Preferably, a chamfered part is formed in the top part of the tilt mirror, and a retaining washer is provided to the position immediately above the recessed part formed in the chamfered part.

Since the recessed part, through which the rotor shaft is penetrated, is formed in the chamfered part of the top part of the tilt mirror, the elastic member can be compressed and attached by providing the retaining washer to the position immediately above the recessed part.

In the optical scanner, a spring member may be fitted between the inner bottom part of the recessed part and the retainer section. With this structure, by concentrically fitting the spring member to the rotor shaft penetrated through the recessed part and providing the retaining washer at the position immediately above the recessed part, the spring member is compressed so that the tilt mirror can be pressed to the rotor yoke by the elasticity of the compressed spring.

Preferably, the rotor and the tilt mirror are recession/projection-fitted to each other so as to prohibit from relatively rotating with respect to each other. With this structure, relative rotation of the tilt mirror, which is rotated together with the rotor, can be prevented, and the tilt mirror can be easily assembled.

In the optical scanner, the tilt mirror may have a plurality of the inclined reflective surfaces whose inclination angles are different from each other. In this case, light quantity can be increased and reflected light can be scanned in a wide range.

By the present invention, the optical scanner, which is capable of highly increasing the reflective area of the tilt mirror and securely retaining the tilt mirror, can be provided.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DESCRIPTION OF THE EMBODIMENTS

Preferred embodiments of an optical scanner relating to the present invention will now be described in detail with reference to the accompanying drawings. Firstly, the optical scanner, which reflects and irradiates a laser beam emitted from a laser irradiation unit in a wide range, will be explained.

Figure 1:
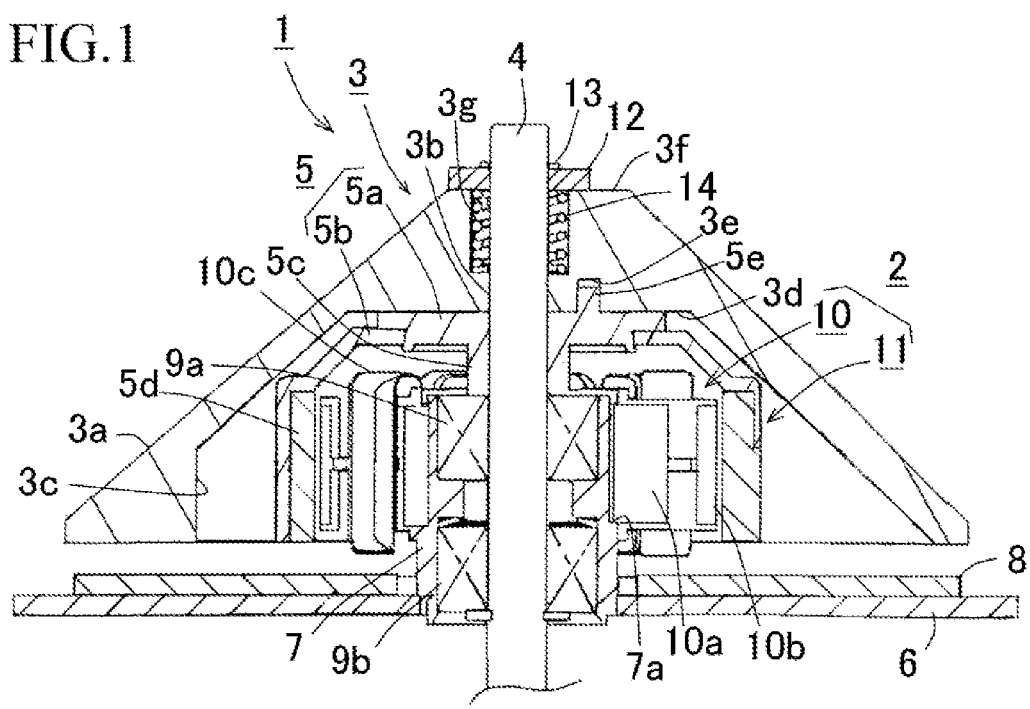
FIG. 1 is an axial sectional view of an optical scanner.

As shown in FIG. 1, in the optical scanner 1, a tilt mirror 3 having reflective surfaces, whose inclination angles are different from each other, is attached to one end part of a rotor shaft 4 of a motor 2 together with a rotor yoke 5. The tilt mirror 3 and the rotor yoke 5 are prohibited from detaching from and rotating with respect to the rotor shaft 4.

Firstly, a structure of the motor 2 will be explained. A stator housing 7 is integrally attached to a base plate 6. A substrate 8, on which Hall elements for detecting magnetic poles of a rotor magnet 5d, etc. are mounted, is attached on the base plate 6.

A first bearing section 9a and a second bearing section 9b are attached in the stator housing 7 which is formed into a cylindrical shape. For example, the first bearing section 9a and the second bearing section 9b are rolling bearings. A step-shaped part 7a is formed in an outer circumferential surface of the stator housing 7. A stator 10 is attached to the step-shaped part 7a. In the stator 10, a stator core 10a is covered with insulators and motor coils 10c are respectively wound on magnetic pole teeth 10b. The stator core 10a is fixed to the stator housing 7 by press fit and adhesive.

The rotor shaft 4 of a rotor 11 is rotatably held by the first bearing section 9a and the second bearing section 9b provided in the stator housing 7. In the rotor yoke 5, a rotor hub 5a and a circular yoke part 5b are integrated with each other by caulking. A sleeve 5c is extended from a center part of the rotor hub 5a toward the yoke part 5b side. The shaft 4 is integrally fitted into the hole of the sleeve 5c by press fit, shrink fit, adhesive, etc. In the rotor hub 5a, a projection 5e is provided on one axial side opposite to the sleeve 5c side. A plurality of the projections 5e may be formed. The rotor magnet 5d is integrally attached on an inner circumferential surface of the yoke part 5b. In the rotor magnet 5d, N-poles and S-poles are alternately formed and faced to the pole teeth 10b of the stator 10.

The tilt mirror 3 is integrated with the rotor 11. The tilt mirror 3 is formed into a multiple truncated pyramid shape and has a plurality of the reflective surfaces 3a whose inclination angles are different from each other. A shaft hole (through-hole) 3b, through which the rotor shaft 4 can be inserted, is formed at a center part of the tilt mirror 3. The reflective surfaces 3a are mirror surfaces, which are formed by vapor-depositing metal on a material of the tilt mirror 3, e.g., metallic material, resin material, or polishing the same. In the tilt mirror 3, a recessed part 3c for accommodating the rotor yoke 5 is formed in a surface facing to the motor 2. A fitting hole 3e is formed in an inner bottom part 3d of the recessed part 3c.

After attaching the stator 10 to the stator housing 7 and inserting the rotor shaft 4 into the stator housing 7 for rotatably holding the rotor 11, the rotor shaft 4 is inserted into the shaft hole 3b so as to set the tilt mirror 3 on the rotor hub 5a. The tile mirror 3 is assembled in a state where the rotor yoke 5 is accommodated in the recessed part 3c and the inner bottom part 3d is set on the rotor hub 5a so as to fit the projection 5e into the fitting hole 3e. By recession/projection-fitting the projection 5e and the fitting hole 3e, the rotor 11 and the tilt mirror 3 can be integrally rotated without relative rotation of the tilt mirror 3 with respect to the rotor 11. Further, the rotor 11 and the tilt mirror 3 can be assembled easily.

Figure 2:
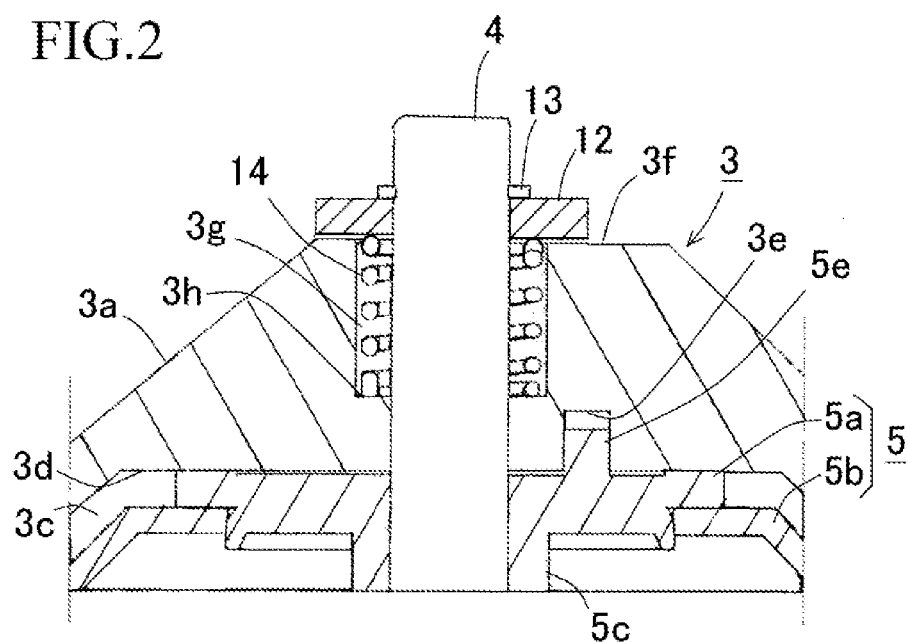
FIG. 2 is a partially enlarged view of a top plate part of a tilt mirror shown in FIG. 1.

As shown in FIG. 2, a chamfered part 3f is formed in a top part of the tilt mirror 3, and a recessed part 3g, through which the rotor shaft 4 is penetrated, is formed in the chamfered part 3f. A retaining washer 12, which acts as a retainer section, is attached to a position immediately above the recessed part 3g, through which the rotor shaft 4 is penetrated, with forming a space from the chamfered part 3f. An axial position of the retaining washer 12 is fixed by a snap ring 13, e.g., e-ring, provided to the rotor shaft 4.

A compressed coil spring 14, which acts as an elastic member, is provided between an inner bottom part 3h of the recessed part 3g and the retaining washer 12. An elastic force of the coil spring 14 always biases the tilt mirror 3 toward the rotor yoke 5, so that axial detachment of the tilt mirror 3 can be prevented.

As shown in FIG. 2, by fitting the projection 5e into the fitting hole 3e, the tilt mirror 3 is attached to the rotor 11 and prohibited from rotating with respect to the rotor 11. The space is formed between the retaining washer 12 and the chamfered part 3f, and another space is formed between a front end of the projection 5e and an inner ceiling part of the fitting hole 3e. With this structure, an excessive pressing force applied by the coil spring 14 can be absorbed, and vibration applied from the rotor 11 to the tilt mirror 3 can be easily absorbed by the coil spring 14. Note that, the elastic member provided in the recessed part 3g is not limited to the coil spring 14. Other elastic members, e.g., plate spring, disc spring, rubber, may be employed.

The chamfered part 3f is formed in the top part of the tilt mirror 3. Preferably, the chamfered part 3f should be eliminated, as much as possible, so as to increase reflective areas of the reflective surfaces 3a as far as the retaining washer 12 can be stably attached.

As described above, the elastic member, e.g., the coil spring 14, is provided between the retaining washer 12, which is attached to the position immediately above the recessed part 3g formed in the top part of the tilt mirror 3, and the inner bottom part 3h of the recessed part 3g, so that the tilt mirror 3 can be always biased toward the rotor yoke 5b and detachment of the tilt mirror 3 can be prevented. Therefore, a height of the tilt mirror 3 can be made higher so as to increase the reflective areas of the reflective surfaces 3a. Further, the axial detachment of the tilt mirror 3 can be prevented without upsizing in the axial direction.

In case that the chamfered part 3f is formed in the top part of the tilt mirror 3 and the recessed part 3g, through which the rotor shaft 4 is penetrated, is formed in the chamfered part 3f, the elastic member, i.e., the coil spring 14, can be attached, in the recessed part 3g, in the compressed state only by attaching the retaining washer 12 to the position immediately above the recessed part 3g.

Concretely, the coil spring 14 is concentrically fitted to the rotor shaft 4, which penetrates the recessed part 3g, and the retaining washer 12 is provided to the position immediately above the recessed part 3g, so that the coil spring 14 is compressed and the tilt mirror 3 can be pressed to the rotor yoke 5 by the elastic force of the compressed coil spring 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. An optical scanner, comprising:
   a motor having an rotor shaft;
   a rotor being attached to one end part of the rotor shaft;
   a tilt mirror being formed into a multiple truncated pyramid shape and having a plurality of inclined reflective surfaces whose inclination angles are different from each other, the tilt mirror being attached to the rotor shaft together with the rotor, wherein the rotor and the tilt mirror are prohibited from detaching from and rotating with respect to the rotor shaft;
   a bearing section being provided to a stator housing and capable of rotatably holding the rotor shaft;
      a chamfered part, which is made thicker in an axial direction, is formed in a top part of the tilt mirror;
      a recessed part, through which the rotor shaft is penetrated, is formed in a chamfered part, and
      an elastic member, which always biases the tilt mirror toward the rotor, is embedded between a retainer section, which is attached to a position immediately above the recessed part, and which retains the elastic member, and an inner bottom part of the recessed part.

2. The optical scanner according to claim 1, wherein a retaining washer, through which the rotor shaft is penetrated, is attached to a position immediately above the recessed part, with forming a space from the chamfered part.

3. The optical scanner according to claim 1, wherein a compressed coil spring is fitted between the inner bottom part of the recessed part and the retainer section.

4. The optical scanner according to claim 1, wherein the rotor and the tilt mirror are recession/projection-fitted to each other so as to prohibit from relatively rotating with respect to each other.

5. The optical scanner according to claim 1, wherein the rotor and the tilt mirror are recession/projection-fitted with forming a space between a bottom part of a fitting hold of the tilt mirror and a front end of a projection of a rotor yoke.

* * * * *